United States Patent [19]

Naiman

[11] Patent Number: 4,851,825

[45] Date of Patent: Jul. 25, 1989

[54] GRAYSCALE CHARACTER GENERATOR AND METHOD

[76] Inventor: Abraham C. Naiman, 1140 Roewill Dr., No. 1, San Jose, Calif. 95117

[21] Appl. No.: 77,791

[22] Filed: Jul. 24, 1987

[51] Int. Cl.$^4$ .............................................. G09G 1/14
[52] U.S. Cl. ................................... 340/728; 340/735; 340/748; 340/750; 364/521
[58] Field of Search ............... 340/728, 793, 750, 748, 340/798, 735; 364/518, 521

[56] References Cited

U.S. PATENT DOCUMENTS

| 4,158,200 | 6/1979 | Seitz et al. | 340/750 |
| 4,486,785 | 12/1984 | Lasher et al. | 340/728 |
| 4,632,579 | 12/1986 | Takano et al. | 340/728 |

OTHER PUBLICATIONS

"Digital Typography", *Scientific American*, vol. 249, No. 2, Aug., 1983, pp. 106–119, Bigelow and Day.
"Summed Area Tables for Texture Mapping", *Computer Graphics*, vol. 18, No. 3, Jul. 1984, pp. 207–212, Crow.
"Minimum Edge Length Decompositions of Rectilinear Figures", Lingas et al., Proc. of 12th Annual Allerton Conf. on Communication, Control & Computing, 1982.
"The Display of Characters Using Gray Level Sample Arrays", *Computer Graphics*, vol. 14, No. 3, Jul. 1980, pp. 302–307, Warnock.

*Primary Examiner*—Gerald L. Brigance
*Attorney, Agent, or Firm*—Flehr, Hohbach, Test, Albritton & Herbert

[57] ABSTRACT

A method and system for efficiently generating grayscale character fonts from bi-level master character fonts decomposed into rectangles. For each filter array to be used for converting master character fonts into grayscale characters there is generated at least one summed area filter array. Each element in each summed area filter array represents the sum of the filter array elements in a corresponding subarray of the filter array. A grayscale character is generated by performing, for each rectangle in the corresponding decomposed master character, the steps of:

specifying a filter array, and its corresponding summed area filter arrays;
determining the pixels in the grayscale character affected by the rectangle and a set of corresponding sampling points located inside and near the rectangle;
for each grayscale character pixel affected by the rectangle, performing the steps of:
assigning the pixel a predefined value corresponding to a black pixel if the corresponding sampling point is located inside the rectangle, and is offset from the perimeter of the rectangle by at least one half of the extent of the filter's support; and otherwise
adding to the value of the grayscale pixel a value from the summed area filter array corresponding to the intersection of the selected filter array, centered at the sampling point corresponding to the grayscale pixel, and the rectangle.

14 Claims, 5 Drawing Sheets

E  R
E  R

GRAYSCALE CHARACTER GENERATOR AND METHOD

The invention relates generally to grayscale display and printing systems and methods, and more specifically to systems and methods for generating grayscale character fonts for use in grayscale display and printing systems.

BACKGROUND OF THE INVENTION

Until recently, most text on raster displays used characters represented as binary matrices, with ones and zeros corresponding to the black and white dots to be displayed. Typically, only one set of characters was provided, simple and tuned to the characteristics of the display.

While bi-level matrix representations of characters work quite well when high-resolution characters and display devices are available, at low resolutions—such as on computer terminals and low cost laser printers—the one-bit characters do not accurately resemble their analog predecessors. FIG. 1 shows how two characters from the Latin 725 Medium font look when printed using a low resolution bi-level font, and when using a grayscale font at the same resolution. As shown in FIG. 1, grayscale devices can increase the effective resolution of a character with a fixed number of pixels by using gray pixels in the representation of a character, as well as black and white ones. Note that for the purposes of this specification, the term "display" refers both to monitor type display devices, and to printers.

The terms "bi-level" and "bi-modal" are used synonymously with the term "black and white" for describing displays and images defined by pixels which are either on or off (i.e., white or black). For the purposes of this description, white pixels form the background, while black pixels form characters.

The term "master character font" refers to any high resolution, bi-level character font which can be used as the basis for generating a "grayscale character font", which is a lower resolution character font in which each pixel is defined using a "grayscale" having a multiplicity (i.e., more than two) of available values.

The terms "summed area filter", "summed area table", "summed area filter array", and "summed area array" are used interchangeably herein, except where otherwise indicated.

Using the present invention, master character fonts are decomposed into rectangles, and each individual rectangle is efficiently convolved with a summed area representation of a filter to construct the grayscale character.

The use of grayscale fonts is based on the principle that, as objects become too small to resolve spatially, size and intensity become interchangeable. One of the principle functions carried out by the human visual system is to find edges in the scene being viewed. When objects are too small to resolve spatially—such as a pixel from a sufficient viewing distance—the gray intensity of that object may be "misinterpreted" as spatial components of light and dark; i.e., an "edge" will be inferred where there really is an area of uniform illumination. It is this perceptual effect which is exploited in the use of grayscale.

Note that grayscale pixels provide no information about the orientation of the inferred edge; that information is deduced by the visual system based on the intensities of the surrounding pixels. For example, assuming for the moment that only the immediately adjacent pixels will influence the perception of a selected grayscale pixel, if the pixels to the left are black, the pixels to the right are white, and those above and below are the same gray as the selected pixel, a vertical edge will be perceived with a sub-pixel position (i.e., at a position between standard pixel grid points) depending on the intensity of the gray pixels. On the other hand, if the pixels above are white, the pixels below are black, and the pixels to the left and right are gray, a horizontal edge will be perceived with a sub-pixel position again depending on the intensity of the gray pixels.

Notice, therefore, that the same value of gray in a selected pixel will at one time be interpreted as resolution in the hoizontal direction and at another time in the vertical direction (or even some other orientation, depending on the surrounding pixels). In other words, once orientation information of the perceived edge is resolved with respect to the surrounding pixels, the grayscale is utilized as resolution information. Therefore, to a first approximation, the added number of grayscale levels (not the added number of bits) is advantageously exploited regardless of the orientation of the edge; it merely serves to position the edge more precisely.

For many applications (such as text entry), it will be sufficient to provide a single version of a grayscale font for each size and style which is needed on a particular display device. However, since grayscale can be used to achieve sub-pixel positioning of edges, one could generate many grayscale versions of the same font at a particular size and for a specific device, each differing only slightly from the next in terms of the sub-pixel position of the character's edges. By using the particular grayscale version which best approximates each character's specified sub-pixel position, one could reduce the spacing error that would otherwise result from positioning characters on whole pixel boundaries.

The standard method of generating grayscale fonts in the prior art is to filter bi-level master character fonts. Unfortunately, most of the previously known, efficient filtering techniques cannot directly be applied. For example, prefiltering is impractical, due to the number of character masters and the requirement of sub-pixel positioning.

The present invention concerns a fast filtering technique especially adapted to the task of producing grayscale fonts from high resolution bi-level master fonts. An important feature of the present invention is that it is so efficient that filtering characters for grayscale displays is feasible in realtime on personal computers and personal workstations.

Although grayscale text has gotten some limited commercial exposure lately (e.g., IBM's Yoda terminal and Bitstream Inc.'s grayscale fonts), two factors have combined to restrict its usage mainly to specialized environments such as paint programs and slide preparation packages, where the grayscale value is used as a weight for interpolating between the text color and a variegated background.

First, the techniques previously discussed in the literature are computationally expensive, and second, there has been little quality control over the resultant fonts. Furthermore, a model of each device must be incorporated into the font generation system because the generation of gray pixels depends on the characteristics of the display device, including pixel size, pixel shape (point spread function), overlap, intensity gamma, and spatial inhomogeneities. Otherwise, good-looking fonts produced for one monitor may not perform well on another. See Kajiya, J. and M. Ullner, "Filtering High Quality Text for Display on Raster Scan Devices," Computer Graphics, Volume 15, Number 3, SIG-GRAPH 1981 Proceedings (August 1981) pp. 7–15.

Therefore a primary object of the present invention is to provide a font production tool which is efficient and filter independent. With appropriate parametrization of a display device's characteristics in the form of an appropriate filter or set of filters, the invention will efficiently produce device dependent grayscale fonts from a master font library.

As will be described below, the present invention can efficiently produce numerous fonts at numerous sizes, for various devices, and can use different filters for different applications. In order for this task to be feasible, fonts must be producible at rates far greater than have heretofore been reported. The detailed description shows how, by meeting a few reasonable assumptions, one can drastically reduce the computational expense of generating grayscale fonts for both experimentation purposes, and more generally for font production.

SUMMARY OF THE INVENTION

In summary, the present invention is a method and system for efficiently generating grayscale character fonts from master fonts. The master character fonts, which are bi-level arrays, are decomposed into rectangles. For each filter array to be used for converting master character fonts into grayscale characters there is generated, at least one, and preferably four summed area filter arrays. Each element in each summed area filter array represents the sum of the filter array elements in a corresponding subarray of the filter array. To be more specific, when the filter is overlapped with a rectangle, the sum of all the elements of the filter in the overlap region is found by extracting one or more elements from the corresponding summed area filter—as determined by the intersection of the filter and the rectangle.

Each filter array is said to have "a filter support" corresponding to the bounded area including all non-zero values of the filter array.

Each grayscale character is generated by performing, for each rectangle in the corresponding decomposed master character, the steps of:

specifying a filter array, and its corresponding summed area filter arrays;

determining the pixels in the grayscale character affected by the rectangle and a set of corresponding sampling points located inside and near the rectangle (i.e., within half the extent of the filter support of the perimeter of the rectangle);

for each grayscale character pixel affected by the rectangle, performing the steps of:

assigning the pixel a predefined value corresponding to a black pixel if the corresponding sampling point is located inside a middle region of the rectangle, which is offset from the perimeter of the rectangle by one half of the extent of the specified filter's support; and otherwise determining the intersection of the selected filter array, centered at the sampling point corresponding to the grayscale pixel, and the rectangle, and adding to the value of the grayscale pixel a value from the summed area filter array corresponding to the determined intersection.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Filtering

Figure 1:
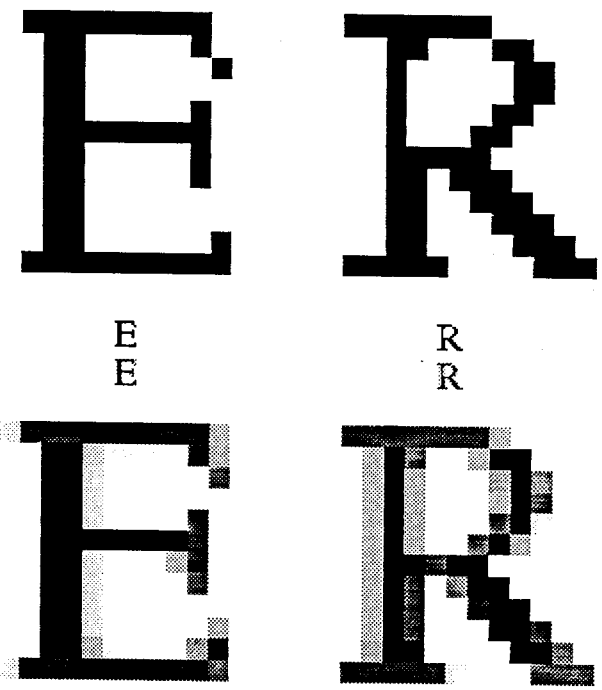
FIG. 1 depicts two characters from Latin 725 Medium, showing how these characters look when printed using a low resolution bi-level font, and when using a grayscale font at the same resolution.
Figure 2:
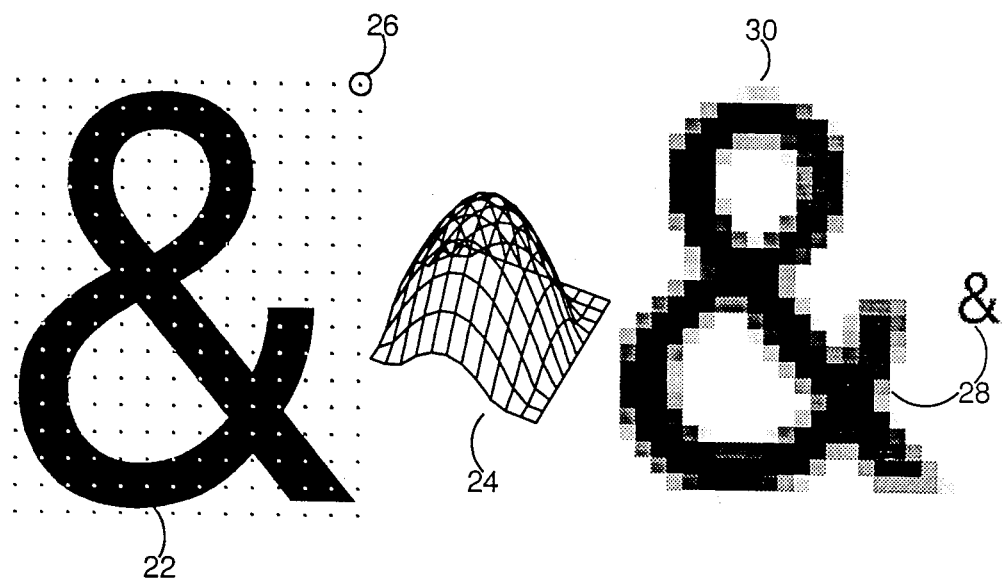
FIG. 2 schematically depicts the direct convolution process for generating grayscale characters.

Referring to FIG. 2, the common method for generating a grayscale character is filtering, whereby a high-resolution raster-encoded master character is convolved with a filter. In particular, a master character 22, is convolved with a filter 24 at each of a predefined array of sample points 26, to generate a grayscale character 28. For each sample point 26 there is generated one grayscale pixel 30 having a value equal to the sum of the filter's values at the black pixels in the master character.

Filters can be defined in various ways, very often analytically (see, for example, Pratt, W. K., Digital Image Processing, John Wiley and Sons, New York, 1978). For the purposes of the present invention, values of the filter are needed only at the locations of the master and therefore each filter is represented by a digitized array of filter values at the resolution of the master.

To simplify the description of the invention, all the two dimensional arrays used will be square and the following notation will be used:

M is an m×m pixel array representing a high-resolution master character, with each pixel having a binary (i.e., 0 or 1) value.

G is a g×g pixel array representing a low-resolution grayscale character, with each pixel having a grayscale value between 0 and 1, inclusive.

F is an f×f pixel array representing a filter for a given filter type and filter overlap, $\Phi$. The linear size, f, of the F array is equal to $\Phi m/g$, and the pixels in F are scaled (i.e., have differing values between zero and one) so that F is normalized:

$$\sum_{y=1}^{f} \sum_{x=1}^{f} F_{xy} = 1.0$$

S is an s×s sampling grid where s=g, with a spacing interval of $\sigma = m/g$ (the ratio between the master and grayscale sizes) between samples. The master font M is overlaid with S. Note that there are $\sigma \times \sigma$ different phases at which S can be overlaid onto M:

if $p \times p$ different phases (i.e., grayscale character sub-pixel positions) are needed, then $s = pg$ with spacing interval $\sigma = m/pg$ if all of the possible phases are needed, then $s = m$ and $\sigma = 1$ F is centered at each of the sampling points $S_{xy}$ and convolved with M, producing up to $p \times p$ different $g \times g$ grayscale characters.

The present invention assumes that its users will provide an appropriate filter (or filters) for convolution with the character master, which sufficiently models the display device so that it can regard it as a linear device in both intensity and space. Filters to be used simply for demonstrating the invention are easy to generate, for example, by using a simple, two dimensional array of values representing a two dimensional bell curve. It should be noted, however, that there is a large body of prior art regarding numerous important issues affecting the quality of the characters generated using grayscale fonts, including:

the appropriateness of particular filters; see, for example, Warnock, J. E., "The display of Characters Using Gray Level Sample Arrays," Computer Graphics, Volume 14, Number 3, SIGGRAPH 1980 Proceedings (July 1980) pp. 302-307, and Catmull, E., "A Tutorial on Compensation Tables," Computer Graphics, Volume 13, Number 2, SIGGRAPH 1979 Proceedings (August 1979) pp. 1-7.

reconstruction of master character fonts from displayed (grayscale) samples; see, for example, Kajiya, J. and M. Ullner, "Filtering High Quality Text for Display on Raster Scan Devices," Computer Graphics, Volume 15, Number 3, SIGGRAPH 1981 Proceedings (August 1981) pp. 7-15.

modeling of the characteristics of display devices; see, for example, Shurtleff, D. A., How to Make Displays Legible, Human Interface Design, La Mirada, Calif., 1980.

the number of grayscale bits necessary; see, for example, Leler, W. J., "Human Vision, Anti-Aliasing, and the Cheap 4000 Line Display," Computer Graphics, Volume 14, Number 3, SIGGRAPH 1980 Proceedings (July 1980) pp. 308-313, and Bruckstein, A. M., "On Optimal Image Digitization," Electrical Engineering Publication Number 577, Faculty of Electrical Engineering, Technion Israel Institute of Technology, Haifa, Israel, February 1986, and possible fatigue of the visual system; see, for example, Gould, J. D. and N. Grischkowsky, "Doing the Same Work with Hard Copy and with Cathode-Ray Tube (CRT) Computer Terminals," Human Factors, Volume 26, Number 3, June 1984, pp. 323-337.

The Problem With Direct Convolution

The straightforward solution to generating grayscale characters is direct convolution, where the filter F is centered at each of the sampling points $S_{xy}$ and all the elements of the master font M under F are multiplied by the values of F and summed. Note that since, in our case, M is binary, only a summing operation is necessary. Thus, direct convolution is defined in this case to be:

$$G_{ij} = \sum_{y=1}^{f} \sum_{x=1}^{f} F_{xy} M_{S_i + x, S_j + y}$$

where $S_i$ and $S_j$ are the x and y positions in M corresponding to the lower left hand corner of the filter for grayscale pixel $G_{ij}$.

In this description, the notation O(), called big "O" notation in theoretical computer science, refers to the general order of complexity for solving a particular problem. For instance, the cost of direct convolution as described above is $O(s^2 \times f^2)$—i.e., the cost, or number of computations, is on the order of the product of $s^2$ and $f^2$.

Not all of the work in the direct convolution method is necessary. Specifically, using direct convolution, the same amount of computation is performed to generate each grayscale pixel regardless of whether that pixel turns out to be black, white, or gray.

However, if all of the $f \times f$ pixels of M within $\pm f/2$ of $S_{xy}$ are on (off), the grayscale pixel will be black (white). In other words, the direct convolution operation generates a black (white) pixel at the same, expensive cost of generating a gray one. Furthermore, much of the summing operation in direct convolution is repeated over and over for the same regions of F, especially when more than one phase is needed.

As shown in Table 1, the actual gray percentage of a character—the number of gray pixels divided by the total number of pixels—is a function of font, character, size, resolution, filter size, filter shape, and sampling phase. Nevertheless, except for very low resolutions, a large majority of the pixels will be either white or black for a wide variety of character fonts.

Thus, it is disadvantageous to be performing the relatively expensive direct convolution operation for each of these black or white pixels, rather than a much cheaper operation which directly generates black or white pixels. As will be seen, the present invention uses a method which is extremely efficient for generating black and white pixels.

TABLE 1

Grayscale Percentage of Two Fonts
Swiss 721 Bold and Latin 725 Medium
at various grayscale character and filter sizes (in pixels)
using 256 × 256 master characters

| Grayscale Size | Filter Overlap | Filter Size | Grayscale Percentage Swiss 721 | Grayscale Percentage Latin 725 |
| --- | --- | --- | --- | --- |
| 16 | 1.0 | 16 | 16 | 18 |
| 32 | 1.0 | 8 | 8 | 9 |
| 64 | 1.0 | 4 | 3 | 3 |
| 16 | 1.25 | 20 | 21 | 22 |
| 32 | 1.25 | 10 | 10 | 11 |
| 64 | 1.25 | 5 | 5 | 6 |
| 16 | 1.5 | 24 | 25 | 26 |
| 32 | 1.5 | 12 | 12 | 14 |
| 64 | 1.5 | 6 | 5 | 6 |

Positioning Accuracy

Positioning accuracy is a problem with both bi-level and grayscale bitmapped displays (i.e., those in which a displayed image is represented by a bitmap of discrete pixels). The simplest example of the positioning problem is that if we want to position a vertical edge at a specified sub-pixel position and can only position the edge on pixel boundaries, then we may be off by as much as one half of a pixel in positioning accuracy. To position an edge 25% of the way between two pixel positions, the image (e.g., a character) with the edge can be prefiltered so that the pixel column representing the edge has values interpolated 25% of the way between the background (white) and foreground (black) colors. However, if this prefiltered image is now our only representation of the edge, the edge may still be off by as much as a half a pixel when one needs to display the image at other sub-pixel positions.

The only methods of achieving improved positioning accuracy are (1) to dynamically filter the edge (i.e., of the image) to the needed sub-pixel position, and (2) to prefilter the edge for all of the possible sub-pixel positions.

If filtering of the edge can be done for any of p equally spaced sub-pixel positions, then our maximum positioning error is reduced to ½p.

In the context of displaying characters, such as a display of the text of this specification, if we have a ½ pixel error in the positioning of a character, one character pair may appear too closely set by ½ a pixel, while the next pair seems too loosely set by ½ a pixel. Where the size of a pixel is large relative to the size of the character, this can lead to disastrous spacing problems. Even for state of the art monitors with a resolution of approximately two pixels per typographer's point, when setting 10-point text (0.1384 inches high, or about 0.35 cm), a ½ pixel error is about 10% of the average inter-character spacing (one quarter of the point size), which would result in variations in the spacing of pairs of characters to be as much as 20%. By using eight different phases in generating the grayscale characters, this error can be reduced to 1.25% and 2.5%. For more common monitors with a resolution of about 1 pixel per typographer's point, the inter-character spacing errors and variations are 20% and 40%, and eight phases can reduce these to 2.5% and 5%.

In some contexts, the use of a single phase for each gray-scale character may be sufficient. However, because the accurate spacing of characters is such an important part of generating high-quality text, the need for utilizing the best possible phases is crucial. Furthermore, not only are different phases needed in the horizontal dimension for accurate positioning of proportionally spaced text, but in the vertical direction as well, in order not to be restricted to leading (i.e., line spacing) of an integral number of pixels and for the proper positioning of superscripts, subscripts, equations, and tabular information.

For many applications, grayscale characters may be needed for several fonts at numerous sizes and for each of, say, 8×8 phases. Since the user may not know ahead of time exactly which characters will be called for, if precomputing the fonts is deemed necessary, all of the possible phase renditions must be generated. However, this may be impractical due to limited storage space.

For example, if Roman, Bold, Italic, and Bold-Italic versions of a 128 character serif and sans-serif font are needed (not including special characters and mathematical symbols) for a 72 pixels per inch, eight bits per pixel screen, at five font sizes (e.g., 8, 10, 12, 14, and 18 points) it will take approximately 51.75 Mb to store the 64 phases (without any encoding):

|   |   |
|---|---|
|   | 4 font versions |
| x | 2 serif/sans |
| x | 128 characters |

-continued

|   |   |
|---|---|
| x | 5 font sizes |
| x | 64 phases |
| x | 165.6 pixels (average grayscale font size) |
| x | 1 byte/pixel |
| 54,263,808 bytes = 51.75 Mb | |

Throw in a more generous selection of fonts (two families is very limited for all but the most mundane tasks) and sizes (e.g., 6, 9, 11, 24, and 36 point), as well as a few monitors of different resolutions and filters of varying suitability, and the storage requirements become astronomical.

Therefore, except for very common tasks such as text editing with fixed pitch screen fonts of a single style, precomputing the grayscale characters appears to be impractical. What we need, then, is the capability to dynamically generate specified character fonts, at any specified size, resolution, and phase, coupled with font caching software to reduce the need to recompute already generated characters. See Fuchs, D. R. and D. E. Knuth, "Optimal Font Caching," STAN-CS-82-901, Department of Computer Science, Stanford University, Stanford, Calif., March 1982.

Rectangular Convolution

Let us reexamine where the work is being done during direct convolution. For a particular sampling grid position $S_{xy}$ in the master character corresponding to grayscale pixel $G_{ij}$, the filter F is centered over the sampling point and is convolved with the master; namely, for each master pixel $M_{S_i+x,S_j+y}$ within the filter support, the value in $F_{xy}$ is added to the output grayscale pixel $G_{ij}$, where $S_i$ and $S_j$ are the x and y positions in M corresponding to the lower left hand corner of the filter for grayscale pixel $G_{ij}$. The term "filter support" is herein used to mean the bounded area including all nonzero values of a filter.

Since the master pixels which fall within the filter support can form an arbitrary pattern, each pixel must be examined to determine its contribution from the filter. This is why the computational expense for the direct convolution operation is $O(f^2)$ per sample.

Alternatively, if, instead of unrelated master pixels, we have a data structure for the master character which describes it in terms of regions of specific shapes, then the convolution operation for $S_i,S_j$ amounts to intersecting the filter array with the r regions of the master character which fall within the filter support to produce O(r) subregions, and extracting the contribution of each of those subregions to the corresponding grayscale pixel $G_{ij}$. Then the computational expense is $$O(r \times (\text{cost of intersection} + \text{cost of extracting contribution})).$$

What we are looking for, then, is a shape which meets the following criteria:
  it is easy to generate from a bitmap;
  it is compact in storage;
  it is easy to intersect with the filter; and
  it is simple to extract the filter contribution from the intersection.

Rectangles are a particularly appealing shape to use, since, for characters, they fulfill each of these criteria.

Certainly, encoding a bitmap into 1×1 pixel rectangles is trivial. (See the discussion below regarding optimal decomposition of bitmaps into rectangles.) Although, in general, rectangular encoding may increase the size of the representation (in the limit, there could be $f^2$ 1×1 pixel rectangles), since characters are very well connected objects—often with rectilinearly oriented components—an encoding into rectangles is likely to be very compact.

Summed Area Filter Arrays. To determine the contribution of a specified rectangle—which represents a portion of a master character—to a grayscale character, one must first determine for each sampling point in that rectangle the overlap between the filter and the rectangle. This overlap is sometimes called herein the "intersecting subrectangle".

Since the filters used in the preferred embodiment are stored in rectangular arrays, the process of determining the intersection of a rectangle with the filter (at a specified sampling point) requires four comparisons to determine the rectilinear lines of intersection, and generates at most one subrectangle. The process of determining the contribution of the intersecting subrectangle to the corresponding grayscale pixel would require, using direct convolution, summing all the filter entries in the intersecting subrectangle.

However, the step of summing all the filter entries in the intersecting subrectangles can be substantially reduced by using a summed area array representation of the filter.

Figure 3:
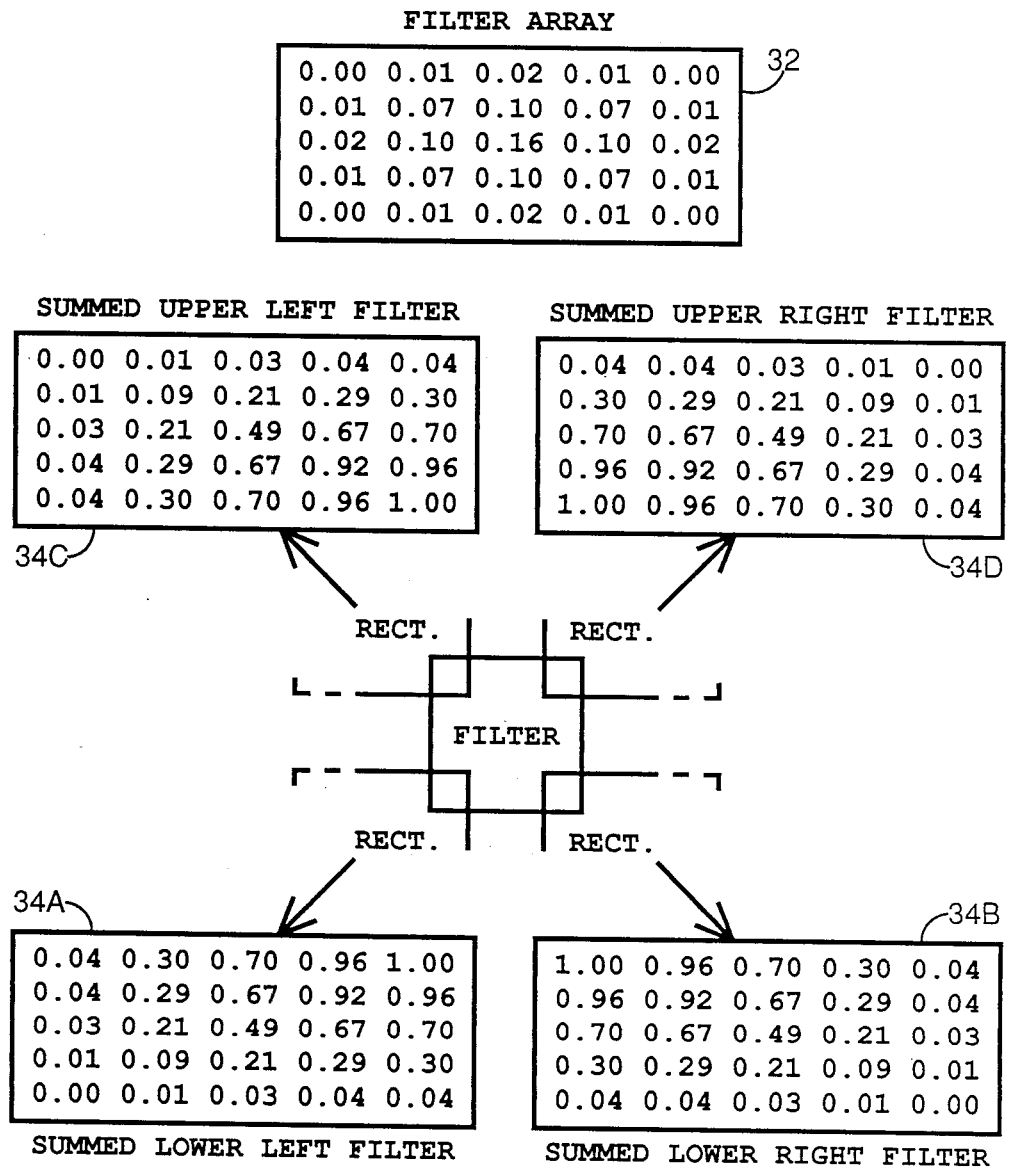
FIG. 3 shows a filter array and four summed area array representations of the filter.

FIG. 3 shows a filter array 32 and four corresponding summed area filter arrays 34A-34D. The entries of summed area filter array 34A are computed as the sum of all the entries of the original array 32 to the left of and below the entry. These summed area arrays are similar to the summed area texture arrays discussed in (1) Crow, F. C., "Summed-Area Tables for Texture Mapping," Computer Graphics, Volume 18, Number 3, July 1984, SIGGRAPH 1984 Proceedings, pp. 207-212; and (2) Ferrari, L. A. and J. Sklansky, "A Fast Recursive Algorithm for Binary-Valued Two-Dimensional Filters," Computer Vision, Graphics, and Image Processing, Volume 26, 1984, pp. 292-302.

As will also be shown below, using a single summed area filter, the cost of extracting the sum of an arbitrary rectangular area of the summed array is four summed array accesses and three additions (actually, two subtractions and one addition).

To convolve a summed area filter at each sampling point in an arbitrary rectangle, four intersections between the filter (centered at the sampling point) and the rectangle must be computed: one each for the left, right, bottom, and top of the intersecting subrectangle. Using the boundaries of the subrectangle as indices into the lower left summed area filter (such as array 34A in FIG. 3), the convolution is performed by computing the sum:

$$F_{tr} - F_{br} - F_{tl} + F_{bl} \quad \text{(Eq. 1)}$$

where $F_{tr}$ is the summer area filter entry for the top-right intersection between the filter and the rectangle, $F_{br}$ is the bottom-right entry, $F_{tl}$ is the top-left entry, and $F_{bl}$ is the bottom-left entry.

Similar equations could be used with other ones of the four summed area filter arrays 34B-34D, but for the purposes of this description the lower left summed area filter and Equation 1 will be used.

Thus the convolution process for a single sampling point involves four filter accesses and three additions to extract the sum of the filter within the intersecting subrectangle. However, when the rectangle is large enough to span the full width and height of the filter array, the grayscale pixels corresponding to sampling points in the middle region of the rectangle—inside the rectangle's boundaries and at least f/2 pixels from the boundary—will always be black. This is because the intersecting subrectangle (formed when the filter is centered over the sampling point) is really the whole filter and we need only add the sum of the whole filter, which has been normalized 1.0.

Although the cost of generating a summed area filter array is $O(f^2)$, it need be computed only once for each filter array that is needed (i.e., for each filter type and size combination), and can be stored in a file for retrieval when needed. Therefore, for r rectangles which fall within the filter support, the computational expense of rectangular convolution is $O(r)$, or, more exactly, $r \times (4$ comparisons $+ 4$ array accesses $+ 3$ additions) per sample.

Another computational cost associated with the use of summed area filter arrays is the cost of determining which of the master rectangles fall within the filter support, when the filter is centered over a selected sampling point $S_{xy}$. However, there is no cost involved whatsoever if, instead of looping on the sampling points and convolving the filter at each sample point to determine a grayscale pixel, we loop on the rectangles and add their "gray" contribution to each grayscale pixel affected by the rectangle. In this manner, a particular grayscale character pixel $G_{ij}$ may be computed in several stages, and when all of the master character rectangles which affect it have been processed, it will have the correct gray value.

Figure 4:
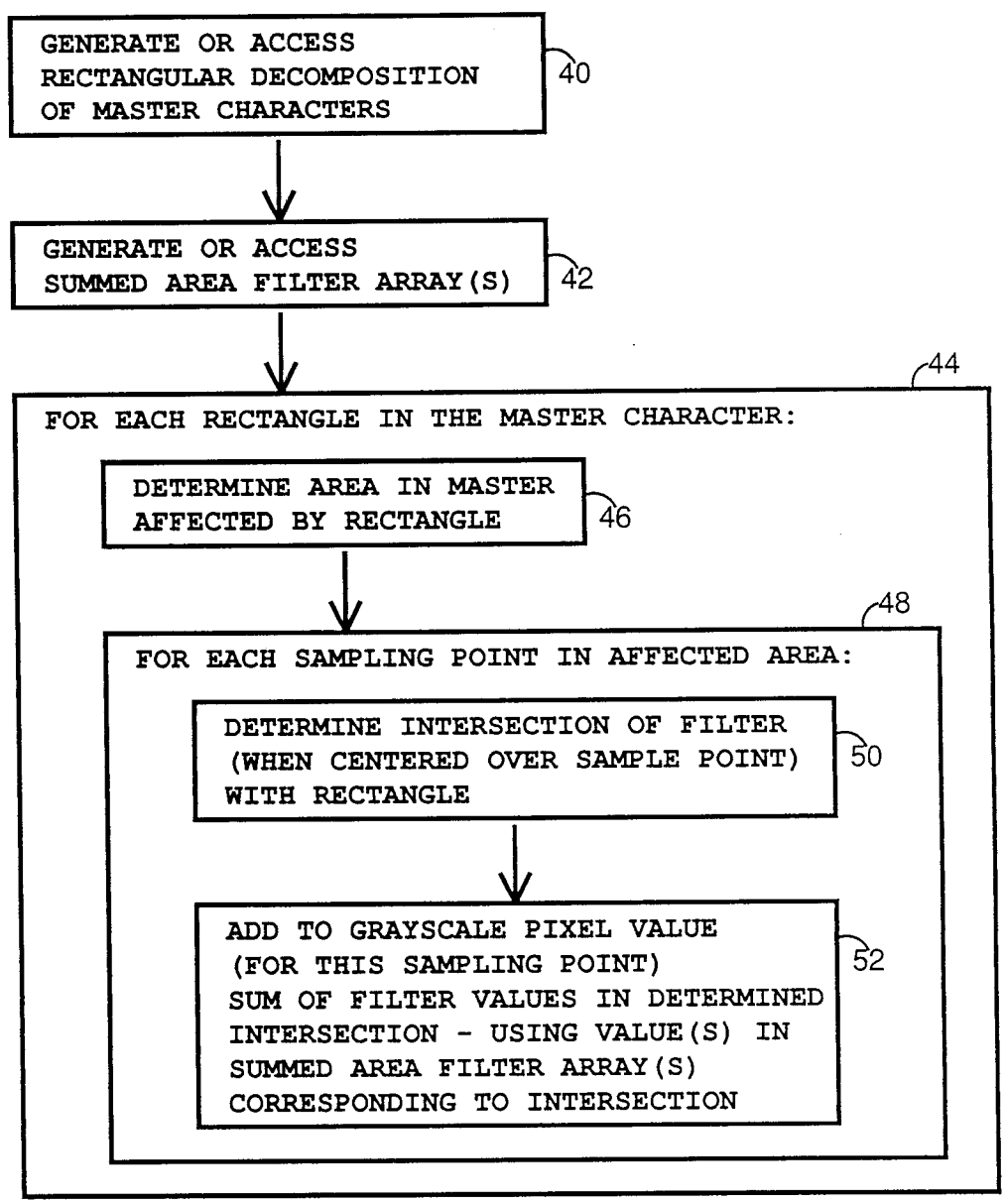
FIG. 4 is a flow chart of the method of the present invention.

The basic process for generating a grayscale character from a master character, then, is as follows (see FIG. 4):

| | |
|---|---|
| generate or access rectangular decomposition of master | (box 40) |
| generate or access summed area filter arrays | (box 42) |
| for each rectangle in the master character | (box 44) |
| determine area in master affected by rectangle | (box 46) |
| for each sampling point in affected area | (box 48) |
| determine intersection of filter (when centered over sampling point) | (box 50) |
| add to sampling point's grayscale pixel sum from summed area array | (box 52) |

Figure 5:
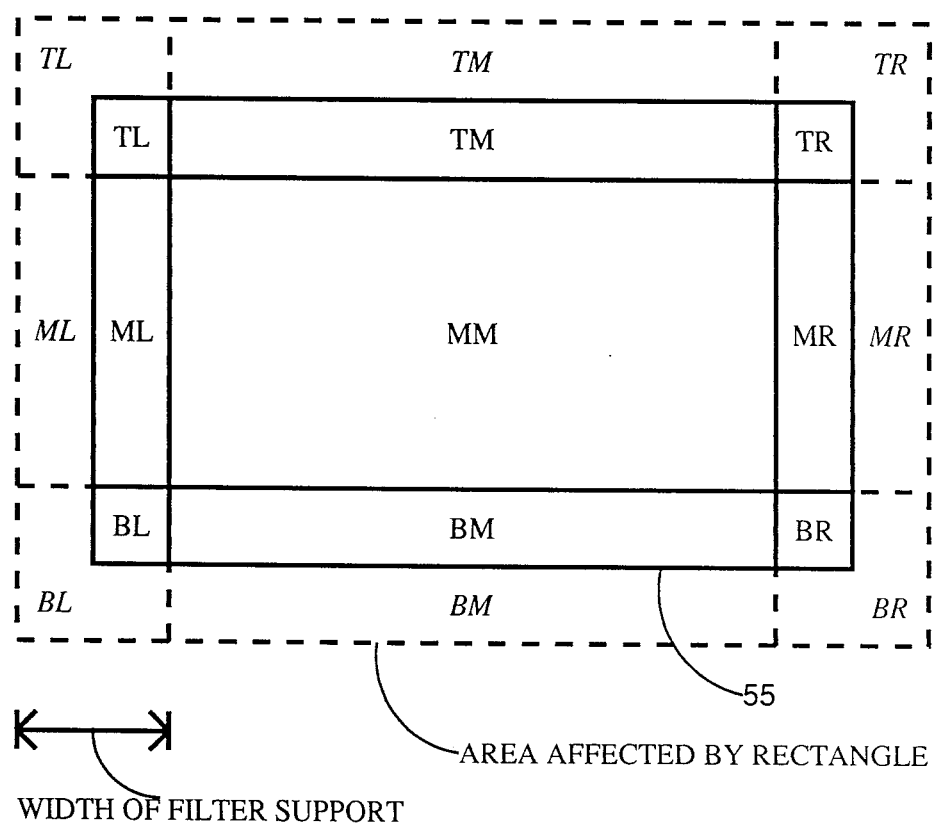
FIG. 5 shows nine areas of interest in a rectangle which spans the width and height of the filter.

In fact, as shown in FIG. 5, there are nine different areas of interest in a master character rectangle 55 which is large enough to span the width and height of the filter. For each of these nine regions, certain portions of the convolution computation shown in Equation 1, above, can be replaced by the use of one or more constant values.

In both FIG. 5 and Table 2, these nine regions are labelled as follows: MM (middle), TM (above), BM (below), ML and MR (to either side), and TL, TR, BL, BR (in the corners). Table 2 shows which portions of the convolution computation (Equation 1) for each of these nine regions can be replaced by the use of a constant value, and which need to be performed. The first row of Table 2 shows that all of the computations noted in Equation 1 must be performed in the "generic" case—i.e., for convolving the filter with a sample point at an unknown location in a rectangle, or at any location in a rectangle which is smaller than half the size of the filter.

For a rough estimate of the amount of computation saved by using a separate convolution formula for each of the nine rectangle regions, using the constant values noted in Table 2, consider the amount of computations which would be required for computing nine grayscale pixels—one in each of the nine regions.

TABLE 2

| Region | Size of Region | Intersection | | | | Filter Access | | | |
|---|---|---|---|---|---|---|---|---|---|
| | | l | r | b | t | tr | −br | −tl | +bl |
| Generic | (w+f)(h+f) | √ | √ | √ | √ | √ | √ | √ | √ |
| BL | $f^2$ | √ | f | √ | f | 1.0 | √ | √ | √ |
| BM | f(w−f) | 0 | f | √ | f | 1.0 | √ | | |
| BR | $f^2$ | 0 | √ | √ | f | √ | √ | | |
| ML | f(h−f) | √ | f | 0 | f | 1.0 | | √ | |
| MM | (w−f)(h−f) | 0 | f | 0 | f | 1.0 | | | |
| MR | f(h−f) | 0 | √ | 0 | f | √ | | | |
| TL | $f^2$ | √ | f | 0 | √ | √ | | √ | |
| TM | f(w−f) | 0 | f | 0 | √ | √ | | | |
| TR | $f^2$ | 0 | √ | 0 | √ | √ | | | |

This Table shows the intersection calculations and summed area filter accesses (as well as additions) needed for a single sampling point for a generic rectangle (width × height) and for nine regions of interest (BottomLeft, BottomMiddle, etc.), when the rectangle is larger than the filter and only one summed area filter is used (with each entry representing the sum of the lower-left rectangle). A √ indicates that the computation specified in that column must be performed. 0, f, and 1.0 are constant values which need not be computed. Empty entries mean no work need be done. See text for further optimization when four summed filters are computed.

When using Equation 1 without the benefit of the constants noted in Table 2, generating these nine grayscale pixels requires 36 index computations, 36 summed area filter array accesses, and 27 additions. Using the shortcuts and constants noted in Table 2, the same pixels are generated using only twelve index computations, twelve summed area filter array accesses, and seven additions suffice. Thus, the number of computations in this example is reduced by approximately a factor of three.

The above analysis actually underestimates the benefits of the method of using Table 2 because it assumes there is a uniform distribution of sampling points within the nine rectangle regions. However, in many situations, rectangular decomposition of master fonts will result in a distribution of sample points in which the number of sample points in the central region (MM) is much greater than one ninth of the total number of sample points. Since sample points in the central region (corresponding to black pixels) require no computation at all, the efficiency of this method is typically even greater than a factor of three.

Although the numbers of intersection calculations in each of the four corner regions (two) and four non-corner, non-central regions (one) are uniform, note that the order of summation used in producing a single summed area filter introduces a bias (in the direction of summation) regarding the extraction of the sum. One consequence of this can be seen in the top-right region (row TR), where only one table access is needed (and no additions), while the bottom-left region (row BL) requires three table accesses and three additions.

Using Four Different Summed Area Filters. We can exploit this bias to our benefit, by precomputing four different summed area filters from the original filter, each one using a different order of summation. As shown in FIG. 3, the four summed area filter arrays 34A–34D represent summation of the lower-left, lower-right, upper-left and upper-right regions of the filter array 32, respectively. Thus each of the four summed area filter arrays 34A–34D corresponds to rectangular subsets of the filter array 32 formed by incremental changes in a corresponding direction in each of the two dimensions of the filter array 32.

Note that for radially symmetric filter arrays, all four of the "different" summed area filter arrays will, in fact, contain the same values arranged in different orientations as shown in FIG. 3.

Using four summed area filters allows for extracting the summed filter contribution in any of the regions of interest of a large rectangle in only one table access (except, of course, for the central region, which does not require any table accesses) and no additions, simply by using the appropriately biased summed area filter. Now, the computations for nine grayscale pixels, with one in each of the nine regions, requires only twelve intersection comparisons, only eight summed filter table accesses and zero additions. Note that one addition per sampling point is always needed to add to the current intermediate value of the grayscale pixel.

It should also be noted that the number of computations can be further reduced by processing the sampling points affected by a rectangle in an order which reduces the number of intersection calculations, and reduces the computations required for selecting the appropriate summed area filter for each sampling point. For instance, one efficient order would be to process all of the sampling points in one region (e.g., region TL) before processing the sampling points in the next region.

Smaller Rectangles. When a character is decomposed into rectangles, there will typically be a number of rectangles which are not large enough to span both the width and height of the filter. For those rectangles which only span the width or height of the filter, there are only six different regions of interest. For rectangles which do not span either the width or height of the filter, the different regions of interest are reduced to four. However, the optimizations just discussed still apply: as long as the rectangle crosses any of the boundaries of the filter support, the number of filter accesses and additions can be reduced.

Finally, if the rectangle does not cross any filter support boundaries (i.e., a small rectangle inside the filter support), we are back to the general case which requires four intersection computations, four summed area filter table accesses, and three additions per sampling point.

The inventor notes that the present invention provides a convenient mechanism for generating characters at different quality levels. In particular, lower quality characters can be generated (e.g., for showing the basic layout of the image or text being generated) by excluding rectangles of less than a certain size from the character generation process. The purpose of providing more than one quality level is to allow the user the flexibility of generating lower quality characters at a faster rate (by using less computations). For instance, the proposed rough cut mechanism could process all rectangles greater than N (e.g., two) pixels in size. If the rectangular decomposition of the characters being used is dominated by relatively large rectangles, the rough cut characters will be of sufficient quality to allow the user to read the generated text and to see its size, positioning and other layout aspects. After revision, the image can be regenerated using higher quality character generation, i.e., using all of the rectangles in the master characters.

Thus, the present invention not only greatly reduces the asymptotic cost of computing gray pixels, but—given a "good" rectangular decomposition of the master character—the cost of generating the black pixels of the grayscale character becomes trivial, and the generation of white pixels comes frr free. This meets one of our original goals of reducing the amount of work for non-gray pixels.

Cost of Rectangular Convolution

The only limitations on filters to be used with the present invention are that each filter must be of finite width of support, and be space-invariant within a single rectangle. Note that it is possible without increased cost to switch filters between rectangles. This allows the implementation of a limited case of space-variant filters. The screen space can be divided into a grid where each cell has its own filter, and the rectangles of the decomposition of the characters are split at the boundaries of the grid cells as they are processed. Within each cell, the appropriate filter is selected by lookup using the cell indices.

As mentioned above, the filters have been digitized at the resolution of the font masters, and the summed versions of the filters are computed. Both computations require $O(f^2)$ operations, but this only has to be done once per filter in the initializaton steps. Once generated, the cost of the algorithm is totally independent of the cost of the filter computation. Therefore, there is no penalty for using high quality filters.

We already saw that for direct convolution the number of operations to filter an $m \times m$ master with an $f \times f$ filter to produce a $g \times g$ grayscale character is $O(g^2 \times f^2)$, assuming constant cost for access into the master. The convolution can also be computed using the discrete Fast Fourier Transform, whose cost is $O(g^2 + m^2 \times \log m)$. However, this is an improvement only for large filters and large numbers of samples.

Most of the efficient filtering techniques known in the field of computer graphics—in particular to filter textures—are aimed at quite different circumstances. Usually there are only a few images which must be repeatedly filtered—often with space variant filters—and they are all available in advance. In such applications, prefiltering the images is a good strategy. See Crow, F. C., "Summed-Area Tables for Texture Mapping," Computer Graphics, Volume 18, Number 3, July 1984, SIG-GRAPH 1984 Proceedings, pp. 207-212; and Williams, L., "Pyramidal Parametrics," Computer Graphics, Volume 17, Number 3, July 1983, SIGGRAPH 1983 Proceedings, pp. 1-11. In the techniques described in these two papers, the cost after prefiltering is $O(g^2)$. However, the storage required is $O(m^2)$ per image, and both the type of allowable filters and the positioning of the filter are limited.

Note the connection between the approach taken here and Crow's summed area tables: here the image is constrained to being a box signal (i.e., bi-level rectangles) and is convolved with an arbitrary summed area filter (which is, in general, smaller than the rectangles), while in Crow's system an arbitrary image is convolved with a box filter, and the textures are, in general, larger than the pixels. Although Heckbert generalized the summed area table technique to a class of filters that can be represented by repeated convolutions of box filters, again, the context is quite different. See Heckbert, P. S., "Filtering by Repeated Integration," Computer Graphics, Volume 20, Number 4, August 1986, SIGGRAPH 1986 Proceedings, pp. 315-321. In particular, the large number of character masters and the requirement of sub-pixel positioning makes the use of prefiltered masters quite impractical.

In asymptotic terms, the cost of performing rectangular convolution to produce a grayscale character is $$\sum_{i=1}^{g^2} r_i \times \text{cost per subrectangle}$$

where $r_i$ is the number of subrectangles which fall under the filter centered over $g_i$. In the worst case, $r_i = f^2$, and the cost for a grayscale character is $O(g^2 \times f^2)$. However, this would only occur when the decomposition results in rectangles which cover only one master pixel for each of the $g^2$ sampling positions.

In general, the number of rectangles in a decomposition is directly related to the number of reflex vertices in the outline, which, for characters, is usually very small. Therefore, a more useful bound is obtained by looking at the cost per master rectangle, rather than per grayscale pixel. From this point of view, the influence of the size of the filter is only felt because a larger filter increases, for each rectangle, the size of the regions where more operations are needed.

In particular, for a $w \times h$ rectangle and an $f \times f$ filter, the cost of processing all the sampling points that fall under the support of the rectangle (including adding the gray contribution to the intermediate grayscale pixels) is $4f^2 + 2f(w+h)$ intersections and $2f(\text{MAX}(w,f) + \text{MAX}(h,f))$ table accesses and additions. As the number of operations for each rectangle is $O(f^2 + f(w+h))$, when the filter is large relative to the rectangle, the cost is proportional to the area of the filter; however, when the filter is small relative to the rectangle, the cost becomes proportional to the perimeter of the rectangle. For alphabetic characters, decomposition will generate $O(m)$ rectangles because rectangular decomposition has an upper bound of run length encoding, which is $O(m)$. Thus the cost of rectangular convolution is proportional only to the linear size of the characters.

Restrictions

Note that there are a few conditions which must be satisfied in order to exploit rectangular convolution:

The filter F has to be computed at the resolution of the master character M. This is not a severe restriction however, since the filter is only computed once, before any convolution takes place, and can be easily computed from an analytical representation at the resolution of the master character (which in itself may have been generated at a specified resolution from an outline description).

The grayscale character G must be randomly accessible. Since a grayscale pixel may be contributed to from several rectangles, one must be able to store partial gray sums for each pixel, and randomly access them to add the contribution when processing a rectangle. Given today's main memory capabilities, this poses no limitation at all. Even for a $128 \times 128$ grayscale character, only 16 Kbyte of memory are needed. Note that this technique does not need storage space proportional to the master character size (unlike previous techniques); therefore, very high resolution masters (e.g., $1024 \times 1024$) can be used even on relatively small computers.

The master character must be bi-level (i.e., black and white). As the summed area table extraction method cannot weight the individual entries, each pixel in the master must be either on or off. However, other than in specialized texture fonts, characters are by nature bi-modal.

Rectangular Decomposition

The method of the present invention is dependent on the representation of the filter as a rectangular summed area table, and on the decomposition of the character into rectangles. While it is obvious that every bitmap character can be decomposed into either possibly overlapping (covering) or non-overlapping (partitioning) rectangles, we should worry about algorithms to do so, metrics to characterize the goodness of the decomposition for our purpose, and optimality according to these metrics.

The most straightforward and immediately available decomposition is into scan segments, which are indeed rectangles, all of height one. These are commonly stored in run length encoded form. From these, the number of rectangles can be reduced by taking into account a replication count, that is, the count of how many times the same scan segment is repeated on successive scan lines without change. This is the representation which was initially used to test the present invention.

The goal of any decomposition should be to minimize the "added edge length" of the rectangles generated, i.e., to minimize the total edge length of the rectangles minus the perimeter length of the original character. To prove this, consider a rectangle of dimensions $w \times h$. With a filter of size $f \times f$, the number of totally black pixels in the central region of interest is $(w-f) \times (h-f)$ or 0 if $w \leq f$ or $h \leq f$. The number of gray pixels to be processed is the total number of pixels to be processed $(w+f) \times (h+f)$ minus the number of black pixels, that is, $2f(w+h)$.

Considering now a decomposition into r rectangles, possibly overlapping, the total number of gray pixels is:

$$f \sum_{i=i}^{r} 2(w_i + h_i)$$

where $2(w_i + h_i)$ is the perimeter of rectangle i, and the sum in the above expression is the sum of the perimeters of all the rectangles. This sum can be divided into three terms: the initial perimeter p of the master character, which is independent of the decomposition, the sum of the lengths of the internal overlapping edges $l_o$, and the sum of the lengths of the internal abutting edges $l_a$, which counts double since these parts of edges are processed twice in the algorithm (once each for the two abutting rectangles). So the total number of gray pixels is:

$$f \sum_{i=i}^{r} 2(w_i + h_i) = f(p + l_o + 2l_a)$$

Since f and p are constant, one has to minimize $l_o + 2l_a$, which is the added edge length. Note that minimizing the added edge length of the rectangles is equivalent to minimizing the total edge length of the rectangles.

Figure 6:
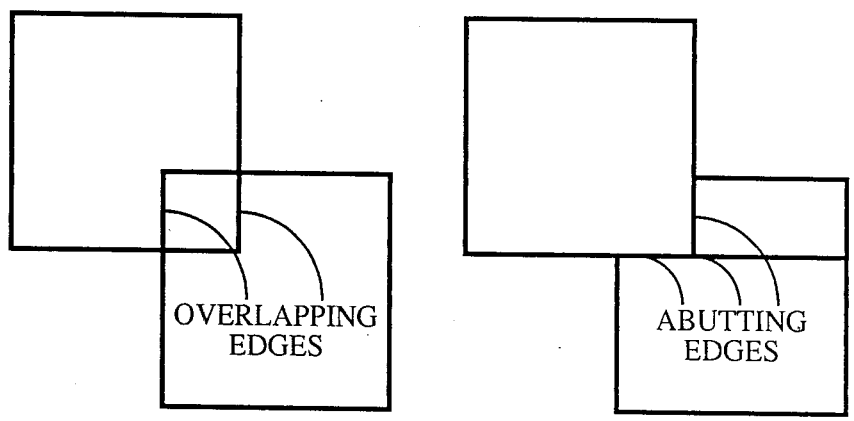
FIG. 6 shows one example where the minimal decomposition with overlapping rectangles generates fewer intermediate gray pixels than a minimal decomposition with disjoint rectangles.

Overlapping rectangles cannot be eliminated on the basis of non-optimality as far as added edge length is concerned. FIG. 6 shows an example where the decomposition into two overlapping squares leads to fewer intermediate gray pixels than any partition into three rectangles. Overlapping rectangles, however, will not be considered, because they cannot be processed independently of each other. Doing so would cause the pixels within the overlap to be given an incorrect weight by being found under the filter too many times (i.e., the number of times the pixel is covered by a rectangle). Therefore, we will consider only non-overlapping rectangles.

Unfortunately, like many similar optimization algorithms, the general problem of decomposing a rectilinear polygon into rectangles such that the total perimeter is minimal is "NP-hard", i.e., belongs to a class of problems that take an unmanageable amount of time even for relatively small input sizes. If a polygon is without holes, the problem is solvable in polynomial time ($O(n^4)$) for n corners, but, of course, many characters do have holes. See Lingas, A., R. Pinter, R. Rivest, and A. Shamir, "Minimum Edge Length Decompositions of Rectilinear Figures," Proceedings of the 12th Annual Allerton Conference on Communication, Control, and Computing, Ill., 1982.

Lingas presents various heuristics for finding a rectangular decomposition within some constant factor of the minimum edge length when there are holes. See Lingas, A., "Heuristics for Minimum Edge Length Rectangular Partitions of Rectilinear Figures," in Theoretical Computer Science, Edited by A. B. Cremers and H. P. Kriegel, Springer-Verlag, Berlin, January 1983, pp. 199-219.

The Lingas heuristics are theoretically interesting, but, for the relatively small number of holes involved in our application, the best approach seems to be to eliminate the holes by adding approximately minimum-length edges from the holes to the boundaries. This can be done in $O(n^2)$ time and gives a solution within a factor of two of the minimum length for this step. See Kou, L., G. Markowski and L. Berman, "A Fast Algorithm for Steiner Trees," Acta Informatica, Volume 15, 1981.

Once the holes have been eliminated, the Lingas minimum edge length algorithm for rectilinear polygons with no holes can be run.

An alternative way to deal with holes would be to decompose them into "negative contribution rectangles", that is, their gray value is subtracted from—rather than added to—the intermediate results. Although this will produce equivalent results, it must allow for intermediate values which could either overflow the maximum (1.0) or underflow the minimum (0.0), which may be impractical.

It should be stressed that rectangular decomposition has only to be done once per master, and therefore the cost of this preprocessing is not an issue of efficiently generating grayscale characters.

Exemplary Implementation

Figure 7:
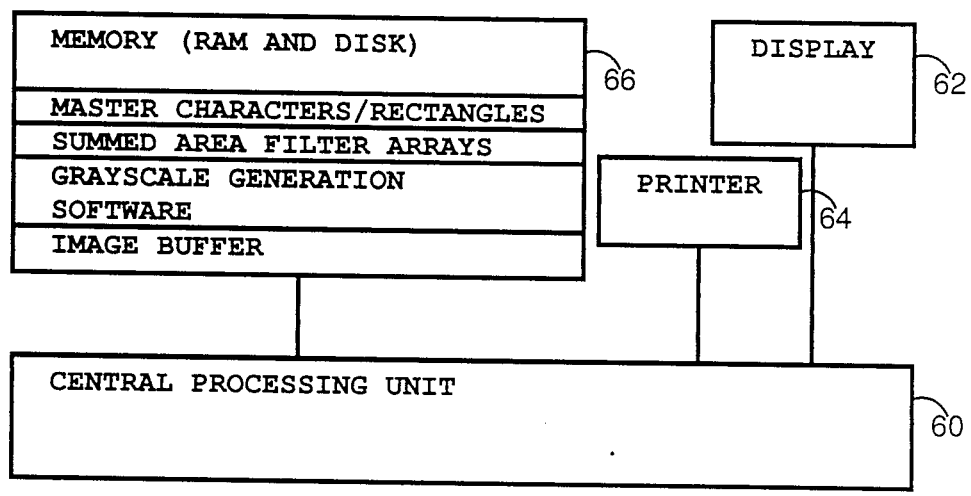
FIG. 7 depicts a computer system incorporating the present invention.

In order to explore the quality of various filters in generating grayscale characters, the inventor implemented a subset of the rectangular convolution technique on a Motorola 68020 class machine (an HP 9000-320). Thus, as shown in FIG. 7, the computer used included a central processing unit 60 incorporating a Motorola 68020, a display 62, a printer 64, and memory 66. The memory 66, including both random access memory and disk storage, stored the master character data structures (i.e., rectangle decompositions of the master characters), a summed area filter, and grayscale character generation software. Grayscale characters are formed in an image buffer in the memory 66 before transmission to the display 62 or printer 64.

In the exemplary implementation, the optimizations discussed above (concerning the reduced intersection calculations for the various regions of interest of a rectangle) were not used. Also only a single summed area filter array was used, in accordance with Equation 1, discussed above.

32-bit fixed-point integer representations of the filter entries were used, where the sum of all the filter entries was normalized to 1.0, and the grayscale pixels were computed in the range of 0 to 255 (where 255 was used to represent black pixels) using one byte to store each grayscale pixel.

As mentioned above, the rectangular decomposition used was the repeating run length encoding method, which does not generate optimal rectangles for the rectangular convolution process, but does a fairly good job on the Swiss 721 Bold font. The Master font size was 256×256.

Since the rectangular decomposition used was not optimal, the timings listed in Tables 3 through 6 should be considered for the relative improvement of rectangular convolution over direct convolution rather than as absolute benchmarks for generating grayscale fonts. Production (optimized) software should achieve at least another order of magnitude speedup over the two orders of magnitude already achieved in the exemplary implementation. Conservatively, this would result in a production rate on the order of 100–1000 characters per second for the filter/character size combinations listed in the Tables.

The timings reported are the average of 52 convolution operations (once for each of the upper and lower case characters), do not include rectangular decomposition or display time, and were obtained with the UNIX profiling utility "prof" at a 20 millisecond resolution. (UNIX is a registered trademark of AT&T Bell Laboratories.)

The timings reported in Tables 3 through 6 demonstrate that the rectangular convolution technique used in the present invention is effective, leading to a considerable speedup in the computation of grayscale fonts, without compromising the characteristics of the filters that can be used. This technique can be employed for realtime display of grayscale characters on systems with the computing power of a personal workstation. Several improvements described in this paper, but not included in the exemplary implementation used to generate the timings shown in Tables 3 through 6—such as optimal rectangular decomposition and the use of four summed area filters—would further reduce the cost of filtering.

TABLE 3

Single Phase Timings (in milliseconds)
Swiss 721 Bold

| Grayscale Size | Filter Overlap | Filter Size | Convolution Time Rectangular | Convolution Time Direct |
|---|---|---|---|---|
| 16 | 1.0 | 16 | 46 | 930 |
| 32 | 1.0 | 8 | 69 | 1010 |
| 64 | 1.0 | 4 | 139 | 1340 |
| 16 | 1.25 | 20 | 49 | 1310 |
| 32 | 1.25 | 10 | 78 | 1520 |
| 64 | 1.25 | 5 | 153 | 1860 |
| 16 | 1.5 | 24 | 55 | 2040 |
| 32 | 1.5 | 12 | 87 | 2120 |
| 64 | 1.5 | 6 | 168 | 2510 |

TABLE 4

All Phase Timings (in milliseconds)
Swiss 721 Bold

| GS Size | Filter Overlap | Filter Size | Total Time Rect. | Total Time Direct | Per-Phase Time Rect. | Per-Phase Time Direct |
|---|---|---|---|---|---|---|
| 16 | 1.0 | 16 | 4605 | 232690 | 18 | 909 |
| 32 | 1.0 | 8 | 2559 | 64210 | 40 | 1003 |
| 64 | 1.0 | 4 | 1673 | 21240 | 105 | 1328 |
| 16 | 1.25 | 20 | 5594 | 323840 | 22 | 1265 |
| 32 | 1.25 | 10 | 3060 | 96170 | 48 | 1503 |
| 64 | 1.25 | 5 | 1887 | 29260 | 118 | 1829 |
| 16 | 1.5 | 24 | 7147 | 526650 | 28 | 2057 |
| 32 | 1.5 | 12 | 3497 | 138220 | 55 | 2160 |
| 64 | 1.5 | 6 | 2073 | 41700 | 139 | 2606 |

TABLE 5

Single Phase Timings (in milliseconds)
Latin 725 Medium

| Grayscale Size | Filter Overlap | Filter Size | Convolution Time Rectangular | Convolution Time Direct |
|---|---|---|---|---|
| 16 | 1.0 | 16 | 58 | 910 |
| 32 | 1.0 | 8 | 79 | 1000 |
| 64 | 1.0 | 4 | 139 | 1330 |
| 16 | 1.25 | 20 | 62 | 1270 |
| 32 | 1.25 | 10 | 87 | 1530 |
| 64 | 1.25 | 5 | 152 | 1870 |
| 16 | 1.5 | 24 | 69 | 2070 |
| 32 | 1.5 | 12 | 102 | 2160 |
| 64 | 1.5 | 6 | 169 | 2450 |

TABLE 6

All Phase Timings (in milliseconds)
Latin 725 Medium

| GS Size | Filter Overlap | Filter Size | Total Time Rect. | Total Time Direct | Per-Phase Time Rect. | Per-Phase Time Direct |
|---|---|---|---|---|---|---|
| 16 | 1.0 | 16 | 4844 | 235440 | 19 | 920 |
| 32 | 1.0 | 8 | 2477 | 64380 | 39 | 1006 |
| 64 | 1.0 | 4 | 1562 | 21340 | 98 | 1334 |
| 16 | 1.25 | 20 | 5820 | 320610 | 23 | 1252 |
| 32 | 1.25 | 10 | 2955 | 94900 | 46 | 1483 |
| 64 | 1.25 | 5 | 1753 | 29150 | 110 | 1822 |
| 16 | 1.5 | 24 | 7723 | 502240 | 30 | 1962 |
| 32 | 1.5 | 12 | 3616 | 133060 | 57 | 2079 |
| 64 | 1.5 | 6 | 1983 | 38940 | 124 | 2434 |

Note that filtering inherently takes care of mismatched aspect ratios, whether they arise from the master character, grayscale character, or display device pixel shape. Furthermore, as in previous methods, the grayscale pixel value can be used as a weight for interpolating between colored text and a variegated background.

Another aspect of the present invention is that the rectangles generated by the decomposition do not have to be stored in any particular data structure and can be processed independently of each other and in any order. This indicates that the present invention can be implemented with a straightforward implementation on multiprocessor systems, whether general purpose or specialized for this particular task.

As mentioned earlier, precomputing all of the phases of all the characters needed is quite out of the question. With the technique of the present invention, many applications will be able to justify the cost of dynamically computing grayscale characters, and not have to rely on a small selection of poor quality fonts.

Extensions and Applications

One additional improvement in speed can easily be achieved by determining, for a given filter support, the pixels that will always be black, and separating them from the rest of the character, so that they are not included in the processing of the rectangles. Since these pixels are already processed very efficiently, this would result in only a modest improvement.

In many applications there is a demand for rotated text. Bitmaps can of course be rotated, and there are clever algorithms to do so. See Guibas, L. J. and J. Stolfi, "A Language for Bitmap Manipulation", ACM Transaction on Graphics, Volume 1, Number 3, July 1982, pp. 191-214.

The present invention, as described herein, is not well adapted to the use of rotated master characters, because the rectangular decomposition would have to be recomputed for every new rotated master. The best way to apply the present invention to generate rotated text is to rotate the sampling grid and apply it to the unrotated master. This rotation has to be done only for one point; the other grid points can be computed by incremental techniques. While the rectangular decomposition of the master is still valid, the filter and its summed area representation would have to be rotated, but this has to be done only once per rotation angle. In fact, for radially symmetric filters this does not even have to be done. The main loss in efficiency is in the computation of the intersection between the filter and the rectangles. For each rectangle, one has to find the sample point closest to one of its corners and then move along the grid points using some form of incremental technique. Each move would, in general, be in both the X and Y directions, and therefore also a little more costly than in the original case.

Lastly, one can also put to good use the flexibility allowed in the choice of the filter. For instance, it may be useful to use different filters for different parts of a character (for example, to emphasize the serifs, or treat leading and trailing edges differently). To this end, one can mark the rectangles of the decomposition based on the parts of the character to which they belong (e.g., vertical stem, diagonal hairline) and use a filter appropriate to that type of shape when displayed on a particular device. It may also be useful to use different filters for different portions of a display.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of generating grayscale characters from bi-level master characters, the steps of the method comprising:
   providing a multiplicity of high resolution bi-level master characters, each said bi-level master character comprising a high resolution grid of bi-level pixel values; said providing step providing a set of rectangles representing the rectangular decomposition of each said bi-level master character;
   providing at least one filter array for converting said high resolution master characters into lower resolution grayscale characters, each filter array having a designated center and an array of elements with a resolution corresponding to the resolution of said master characters, the values of said filter elements representing the contributions of corresponding bi-level master pixel values to a grayscale pixel located at the center of said filter array;
   specifying a sampling grid of grayscale pixels having a lower resolution than the resolution of said selected bi-level master character; and
   generating each grayscale character by performing, for at least a multiplicity of said rectangles in said set of rectangles representing the decomposition of a corresponding one of said master characters, the steps of:
   specifying the location of said rectangle with respect to said sampling grid of grayscale pixles;
   specifying a filter array to be used;
   determining the grayscale pixels in said sampling grid affected by said rectangle by determining the sampling grid pixels for which at least one nonzero element of said specified filter array will overlap said reactangle when said specified filter array is centered on said pixels;
   for each said sampling grid grayscale pixel affected by said rectangle, performing the steps of:
   assigning said grayscale pixel a predefined value corresponding to a black pixel if the nonzero elements of said specified filter array are all inside said rectangle when said filter array is centered at said grayscale pixel; and otherwise
   determining the intersection of said specified filter array, centered at said grayscale pixel, and said rectangle, and adding to the value of said grayscale pixel a value equal to the sum of said specified filter array's elements in said intersection.

2. The method set forth in claim 1, wherein said set of rectangles representing the rectangular decomposition of each said bi-level master character excludes rectangles less than a certain specified size.

3. The method set forth in claim 1, wherein said first providing step provides a set of nonoverlapping rectangles for each said master character.

4. The method set forth in claim 1, wherein said second providing step provides a plurality of filter arrays, and said generating step includes the step of specifying one of said plurality of filter arrays to be used with each of said multiplicity of rectangles;
   whereby different filter arrays can be used with different rectangles when generating grayscale characters.

5. A method of generating grayscale characters from bi-level master characters, the steps of the method comprising:
   providing a multiplicity of high resolution bi-level master characters, each said bi-level master character comprising a high resolution grid of bi-level pixel values; said providing step providing a set of rectangles representing the rectangular decomposition of each said bi-level master character;
   providing at least one filter array for converting said high resolution master characters into lower resolution grayscale characters, each filter having a designated center and an array of elements with a resolution corresponding to the resolution of said master characters, the values of said filter elements representing the contributions of corresponding bi-level master pixel values to a grayscale lixel located at the center of said filter array; each said filter array having a filter support corresponding to the extent of said filter array's nonzero elements; and providing, for each filter array, at least one summed area filter array, wherein each element in said summed area filter array represents the sum of the filter array elements in a corresponding rectangular subarray of said filter array;

specifying a sampling grid of grayscale pixels having a lower resolution than the resolution of said selected bi-level master character; and generating each grayscale character by performing, for each said rectangle in said set of rectangles representing the decomposition of a corresponding one of said master characters, the steps of:

specifying the location of said rectangle with respect to said sampling grid of grayscale pixels;

specifying a filter array to be used;

determining the grayscale pixels in said sampling grid affected by said rectangle by determining the sampling grid pixels for which at least one non-zero element of said specified filter array will overlap said rectangle when said specified filter array is centered on said pixels;

for each said grayscale pixel in said sampling grid affected by said rectangle, performing the steps of:

aasigning said grayscale pixel a predetermined value corresponding to a black pixel if the filter support for said specified filter array is totally inside said rectangle when said filter array is centered at said grayscale pixel; and otherwise determining te intersection of a selected filter array, centered at said grayscale pixel, and said rectangle, and adding to the value of said grayscale pixel a value from an element of the summed area filter array corresponding to said specified filter, said element corresponding to the subset of said filter array in said determined intersection.

6. The method set forth in claim 5, wherein each said filter array is a two dimensional array of elements, including four corner elements;

said third providing step provides four different summed area filter arrays for at least one said fitler array, the elements in each said summed area filter array representing the sum of corresponding rectangular subsets of said filter array when a corresponding one of said four corner elements is included in said rectangular subset; and said adding step includes, when said determined intersection includes at least one of said four corner elements of said specified filter array, the steps of selecting the corresponding one of said four different summed area filter arrays, selecting from said selected summed area filter array a single element which corresponds to the rectangular subset of said filter array in said determined intersection, and adding the value of said selected single element to the value of said grayscale pixel.

7. A method of generating grayscale characters from bi-level master characters, the steps of the method comprising:

providing a multiplicity of high resolution bi-level master characters, each said bi-level master character comprising a high resolution grid of bi-level pixel values; said providing step providing a set of rectangles representing the rectangular decomposition of each said bi-level master character;

providing at least one filter array for converting said high resolution master characters into lower resolution grayscale characters, each filter array having a designated center and an array of elements with a resolution corresponding to the resolution of said master characters, the values of said filter elements representing the contributions of corresponding bi-level master pixel values to a grayscale pixel located at the center of said filter array; each said filter array having a filter support corresponding to the extent of said filter array's nonzero elements;

providing, for each filter array, a summed area filter array, wherein each element in said summed area filter array represents the sum of the filter array elements in a corresponding subarray of said filter array;

specifying a sampling grid of grayscale pixels having a lower resolution than the resolution of said selected bi-level master characters; and generating a grayscale character by performing, for at least a multiplicity of said rectangles in said set of rectangles representing the decomposition of a corresponding one of said master characters, the steps of:

specifying the location of said rectangle with respect to said sampling grid of grayscale pixels;

specifying a filter array to be used with said rectangle;

determining the grayscale pixels in said sampling grid affected by said rectangle by determining the sampling grid pixels for which said filter support of said specified filter array overlaps said rectangle when said specified filter array is centered on said pixels;

for each said grayscale pixel in said sampling grid affected by said rectangle, determining the intersection of said rectangle and said specified filter array, centered at the grayscale pixel corresponding to said grayscale pixel, and said rectangle, and then adding to the value of said grayscale pixel the value of an element in said summed area filter array corresponding to said specified filter array, said element corresponding to the subset of said filter array in said determined intersection.

8. The method set forth in claim 7, wherein said generating step includes the step of assigning to each said grayscale pixel a predefined value corresponding to a black pixel if the filter support for said specified filter array is totally inside said rectangle when said filter array is centered at the said grayscale pixel in said sampling grid.

9. The method set forth in claim 8, wherein each said filter array is a two dimensional array of elements including four corner elements, and said third providing step provides a set of four different summed area filter arrays for at least one said filter array, the elements in each said summed area filter array representing the sum of corresponding rectangular subsets of said filter array when a corresponding one of said four corner elements is included in said rectangular subset; and said adding step includes selecting a summed area filter array from said set of four different summed area filter arrays, in accordance with the ones of said four corner elements in said determined intersection.

10. The method set forth in claim 7, wherein said second providing step provides a plurality of filter arrays, and said generating step includes the step of specifying one of said plurality of filter arrays to be used with each of said multiplicity of rectangles;

whereby different filter arrays can be used with different rectangles when generating grayscale characters.

11. Apparatus for generating grayscale characters from bi-level master characters, comprising:

first storage means for storing master font data representing a multiplicity of high resolution bi-level master characters, each said bi-level master character comprising a high resolution grid of bi-level pixel values; said master font data including a set of rectangles representing the rectangular decomposition of each bi-level master character to be used;

second storage means for storing filter data, including at least one filter array for converting master characters into grayscale characters, each filter array having a designated center and an array of elements with a resolution corresponding to the resolution of said master characters, the values of said filter elements representing the contributions of corresponding bi-level master pixel values to a grayscale pixel located at the center of said filter; each said filter array having a filter support corresponding to the extent of said filter array's nonzero elements; said filter array being stored in the form of a summed area filter array, wherein each element in said summed area filter array represents the sum of the filter array elements in a corresponding rectangular subarray of said filter array; and data processing means for generating a specified grayscale character, including software means for processing at least a multiplicity of said rectangles in said set of rectangles representing the decomposition of a corresponding one of said master characters, said software means including:

means for specifying a filter array to be used with said rectangle;

means for specifying a sampling grid of grayscale pixels having a lower resolution than the resolution of said selected bi-level master character;

means for specifying the location of said rectangle with respect to said sampling grid of grayscale pixels;

means for determining the grayscale pixels in said sampling grid affected by said rectangle by determining the grayscale pixels for which said filter support of said specified filter array overlaps said rectangle when said specified filter array is centered on said grayscale pixels; and grayscale value assigning means for assigning values to each said grayscale pixel affected by said rectangle, including:

intersection determining means for determining the intersection of said rectangle and said specified filter array, centered at said grayscale pixel; and adding means for adding to the value of said grayscale pixel the value of an element in said summed area filter array corresponding to said specified filter array, said element corresponding to the subset of said filter array in said determined intersection.

12. The apparatus set forth in claim 11, wherein said grayscale value assigning means further includes black pixel assigning means for assigning to a grayscale pixel a predefined value corresponding to a black pixel if the filter support for said specified filter array would be totally inside said rectangle when said filter array is centered at said grayscale pixel in said sampling grid.

13. The apparatus set forth in claim 11, wherein said second storage means stores a plurality of filter arrays, and said data processing means includes means for specifying one of said plurality of filter arrays to be used with each of said multiplicity of rectangles;

whereby different filter arrays can be used with different rectangles when generating grayscale characters.

14. The apparatus set forth in claim 11, wherein each said filter array is a two dimemsional array of elements including four corner elements, and said second storage means stores a set of four different summed area filter arrays for at least one said filter array, the elements in each said summed area filter array representing the sum of corresponding rectangular subsets of said filter array when a corresponding one of said four corner elements is included in said rectangular subset; and said adding means includes means for selecting a summed area filter array from said set of four different summed area filter arrays, in accordance with the ones of said four corner elements in said determined intersection.

* * * * *